(12) United States Patent
Burrell

(10) Patent No.: US 10,517,287 B2
(45) Date of Patent: Dec. 31, 2019

(54) EXTENSIBLE PESTICIDE APPLICATOR

(71) Applicant: Dustin Oralleus Burrell, Kissimmee, FL (US)

(72) Inventor: Dustin Oralleus Burrell, Kissimmee, FL (US)

(*) Notice: Subject to any disclaimer, the term of this patent is extended or adjusted under 35 U.S.C. 154(b) by 411 days.

(21) Appl. No.: 15/630,015

(22) Filed: Jun. 22, 2017

(65) Prior Publication Data

US 2017/0367316 A1 Dec. 28, 2017

Related U.S. Application Data

(60) Provisional application No. 62/354,720, filed on Jun. 25, 2016.

(51) Int. Cl.
| | | |
|---|---|---|
| *A01M 11/00* | (2006.01) | |
| *B08B 1/00* | (2006.01) | |
| *A01M 99/00* | (2006.01) | |
| *B05D 1/02* | (2006.01) | |
| *B05B 11/06* | (2006.01) | |
| *B05B 11/00* | (2006.01) | |
| *B05B 15/628* | (2018.01) | |

(Continued)

(52) U.S. Cl.
CPC ............ *A01M 11/00* (2013.01); *A01M 99/00* (2013.01); *B05B 7/1418* (2013.01); *B05B 7/1486* (2013.01); *B05B 7/2418* (2013.01); *B05B 11/061* (2013.01); *B05B 11/062* (2013.01); *B05B 11/30* (2013.01); *B05B 15/628* (2018.02); *B05D 1/02* (2013.01); *B08B 1/00* (2013.01); *B08B 1/001* (2013.01); *B05B 7/1495* (2013.01)

(58) Field of Classification Search
CPC ............ A01M 1/2002; A01M 1/2027; A01M 1/2038; A01M 1/20; A01M 7/00; A01M 7/0003; A01M 7/0025; A01M 7/0032; A01M 7/0046; A01M 9/00; A01M 9/0038; A01M 11/00; A01M 99/00; B05B 11/062; B05B 11/30; B05B 9/08; B05B 11/00; B05B 5/00; B05D 1/02; B08B 1/001
See application file for complete search history.

(56) References Cited

U.S. PATENT DOCUMENTS 454,117 A * 6/1891 Myers ................. A01M 21/043
47/1.5
753,125 A * 2/1904 Cooper ................ A46B 11/063
401/287

(Continued)

*Primary Examiner* — Marc Burgess
*Assistant Examiner* — Michael A. Fabula
(74) *Attorney, Agent, or Firm* — Williams Intellectual Property; Benjamin F. Williams

(57) ABSTRACT

An extensible pesticide applicator is provided enabling application of both liquid and powdered insecticides to distal, out-of-reach areas. An extensible pole has a distal and a proximal end for manual wielding whereby a pair of nozzles is deployable proximal an out-of-reach habitat. Pressurization of ambient atmosphere into the extensible pole is enabled by a pump member and timed release of the pressurized ambient atmosphere to forcibly eject powdered and alternately liquid pesticide from the distal end is enabled by manual action effected to depress a trigger member. Direct application of pesticide is thereby enabled to distal and out-of-reach habitat without a user coming into proximity with the habitat or the pesticide released.

10 Claims, 7 Drawing Sheets

(51) Int. Cl.
  *B05B 7/24* (2006.01)
  *B05B 7/14* (2006.01)

(56) References Cited

U.S. PATENT DOCUMENTS

| | | | | |
|---|---|---|---|---|
| 772,454 A * | 10/1904 | Brandt | B05B 9/08 | 239/152 |
| 1,976,340 A * | 10/1934 | Gretschel | A01M 7/005 | 239/536 |
| 2,112,603 A * | 3/1938 | Perron | A01M 9/0038 | 222/75 |
| 2,239,464 A * | 4/1941 | Moger | A01M 25/006 | 222/505 |
| 2,500,816 A * | 3/1950 | Gird | A01M 11/00 | 239/311 |
| 2,522,621 A * | 9/1950 | Keyl | B05B 11/062 | 222/634 |
| 2,564,058 A * | 8/1951 | Fletcher | B05B 11/062 | 222/631 |
| 2,606,392 A * | 8/1952 | Graham | B05B 11/062 | 222/189.03 |
| 2,707,068 A * | 4/1955 | Williamson | A01M 25/006 | 222/175 |
| 2,737,318 A * | 3/1956 | Molinare | A01B 1/02 | 222/191 |
| 2,911,157 A * | 11/1959 | Converse | A01G 25/00 | 239/754 |
| 3,020,579 A * | 2/1962 | O'Connor | B05C 17/00 | 401/188 R |
| 3,989,388 A * | 11/1976 | Sparr, Sr. | A46B 9/02 | 401/11 |
| 4,206,714 A * | 6/1980 | Walsh | A01C 5/02 | 111/92 |
| 4,225,065 A * | 9/1980 | Brehm | B05B 11/062 | 222/631 |
| 4,323,196 A * | 4/1982 | Logue | B05B 15/62 | 239/532 |
| 4,352,463 A * | 10/1982 | Baker | A01M 11/00 | 180/383 |
| 4,356,528 A * | 10/1982 | Coffee | B05B 5/04 | 118/626 |
| 4,399,945 A * | 8/1983 | Ruud | B05B 5/047 | 239/697 |
| 4,407,454 A * | 10/1983 | Massey | B05B 9/0805 | 239/154 |
| 4,413,440 A * | 11/1983 | Schultz | A01M 25/006 | 111/95 |
| 4,470,550 A * | 9/1984 | Coffee | A01M 7/0035 | 239/697 |
| 4,760,807 A * | 8/1988 | Keller | A01C 7/02 | 111/92 |
| 4,858,830 A * | 8/1989 | Proctor | A01M 7/0046 | 239/313 |
| 4,886,208 A * | 12/1989 | Strand | A01C 15/04 | 239/77 |
| 4,955,538 A * | 9/1990 | Laube | A01C 17/00 | 239/1 |
| 5,339,994 A * | 8/1994 | Nuila | A01C 15/02 | 111/95 |
| 5,344,074 A * | 9/1994 | Spriggs | B01F 5/0403 | 239/10 |
| 5,419,495 A * | 5/1995 | Berfield | B05B 7/2443 | 137/888 |
| 5,775,590 A * | 7/1998 | Utter | B05B 15/62 | 239/152 |
| 6,003,787 A * | 12/1999 | Fisher | A01M 7/0017 | 239/355 |
| 6,205,702 B1 * | 3/2001 | Ammons | A01M 1/2038 | 43/124 |
| 6,209,800 B1 * | 4/2001 | Thomas | F16L 11/04 | 239/195 |
| 6,409,097 B1 * | 6/2002 | McCauley | A01M 9/0038 | 239/289 |
| 6,415,990 B1 * | 7/2002 | Kiplinger | B05B 11/062 | 239/215 |
| 6,446,884 B1 * | 9/2002 | Utter | A01G 25/145 | 222/386 |
| 6,560,806 B1 * | 5/2003 | Lawson | A47L 9/244 | 8/158 |
| 6,581,326 B1 * | 6/2003 | Smith | A01M 1/2038 | 43/124 |
| 6,663,307 B2 * | 12/2003 | Kopanic | A01M 7/00 | 222/174 |
| 6,672,313 B2 * | 1/2004 | Battaglia | A46B 11/0017 | 132/112 |
| 6,837,447 B1 * | 1/2005 | Clark | A01M 7/0003 | 239/142 |
| 6,925,751 B2 * | 8/2005 | Williams | A01M 9/0046 | 43/132.1 |
| 6,976,644 B2 * | 12/2005 | Troudt | B05B 15/652 | 239/587.1 |
| 6,981,457 B2 * | 1/2006 | Stolz | A01C 15/02 | 111/130 |
| 7,040,510 B1 * | 5/2006 | Hester | B05B 11/3056 | 222/174 |
| 7,076,916 B2 * | 7/2006 | Bianchini | A01M 1/2038 | 222/174 |
| 7,478,453 B1 * | 1/2009 | Busshaus | A47L 13/38 | 15/144.3 |
| 7,517,355 B2 * | 4/2009 | Drake | A61L 26/0023 | 606/213 |
| 7,717,300 B1 * | 5/2010 | Yarrusso, Jr. | A01M 1/2038 | 222/174 |
| 7,717,354 B1 * | 5/2010 | Robinson | A45F 5/02 | 239/1 |
| 7,735,436 B2 * | 6/2010 | Modaresi | A01C 15/02 | 111/95 |
| 7,806,612 B1 * | 10/2010 | Wangler | A46B 9/005 | 15/230.11 |
| 8,029,206 B2 * | 10/2011 | McCarthy | B65D 83/208 | 222/174 |
| D685,152 S * | 6/2013 | Smith | D32/40 | |
| 8,641,309 B2 * | 2/2014 | Perry | A47L 13/26 | 401/137 |
| 9,016,600 B2 * | 4/2015 | Pearson | F41H 9/10 | 169/85 |
| 9,078,393 B1 * | 7/2015 | Polizotto | A01C 21/005 | |
| 9,648,862 B1 * | 5/2017 | Lievano | A01M 7/005 | |
| 9,681,653 B2 * | 6/2017 | Peterson | A01M 7/0046 | |
| 9,901,950 B1 * | 2/2018 | Thompson | B05B 15/68 | |
| 10,021,872 B2 * | 7/2018 | Biyani | A01M 7/006 | |
| 2003/0041506 A1 * | 3/2003 | Coventry | A01M 1/08 | 43/132.1 |
| 2003/0053846 A1 * | 3/2003 | Kopanic | A01M 7/00 | 401/138 |
| 2003/0081983 A1 * | 5/2003 | Waddell | A46B 11/063 | 401/286 |
| 2003/0106257 A1 * | 6/2003 | Smith | A01M 1/2038 | 43/132.1 |
| 2003/0150936 A1 * | 8/2003 | Bristor | B01F 13/0033 | 239/307 |
| 2003/0233969 A1 * | 12/2003 | Stolz | A01C 15/02 | 111/92 |
| 2005/0082389 A1 * | 4/2005 | Sanchez | A62C 17/00 | 239/332 |
| 2005/0108922 A1 * | 5/2005 | Bianchini | A01M 1/2038 | 43/132.1 |
| 2005/0147761 A1 * | 7/2005 | Parks | B01F 5/0615 | 427/421.1 |
| 2005/0268829 A1 * | 12/2005 | Longo | A01C 15/02 | 111/92 |
| 2005/0279017 A1 * | 12/2005 | James | A01M 1/2038 | 43/132.1 |
| 2007/0034709 A1 * | 2/2007 | Daniel, Jr. | A01M 7/0046 | 239/146 |
| 2007/0054040 A1 * | 3/2007 | Drake | A61L 26/0023 | 427/180 |
| 2007/0071903 A1 * | 3/2007 | Claar | B05D 1/02 | 427/421.1 |

(56) References Cited

U.S. PATENT DOCUMENTS

| | | | |
|---|---|---|---|
| 2007/0113762 A1* | 5/2007 | Phillips, Jr. | A01C 15/02 111/96 |
| 2007/0186813 A1* | 8/2007 | Smith | B05B 7/0846 106/281.1 |
| 2009/0008473 A1* | 1/2009 | Yun | A01M 7/0021 239/85 |
| 2009/0008476 A1* | 1/2009 | Bonet Villoria | A01M 7/0035 239/154 |
| 2009/0173805 A1* | 7/2009 | Loaces | A01D 34/84 239/289 |
| 2010/0037511 A1* | 2/2010 | Schier | A01M 3/02 43/137 |
| 2010/0230515 A1* | 9/2010 | Wu | A01C 23/008 239/373 |
| 2011/0113586 A1* | 5/2011 | Loaces | A01D 34/84 15/322 |
| 2012/0153042 A1* | 6/2012 | Oedekoven | A01G 25/09 239/172 |
| 2013/0186977 A1* | 7/2013 | Fornaro | B05B 9/085 239/127 |
| 2013/0240636 A1* | 9/2013 | Duffle | B05B 7/26 239/1 |
| 2014/0034685 A1* | 2/2014 | Meyers | B05B 11/30 222/401 |
| 2014/0166767 A1* | 6/2014 | Michael | A01M 7/0046 239/1 |
| 2015/0003884 A1* | 1/2015 | Kast | A01M 7/0046 401/4 |
| 2015/0097058 A1* | 4/2015 | Stine | B05B 9/0805 239/373 |
| 2015/0136174 A1* | 5/2015 | Paro | A47L 13/26 134/6 |
| 2015/0366127 A1* | 12/2015 | Roberge | A01M 7/00 239/8 |
| 2017/0079200 A1* | 3/2017 | Posselius | B05B 9/0403 |
| 2017/0118973 A1* | 5/2017 | Biyani | A01M 7/006 |
| 2017/0252757 A1* | 9/2017 | Peterson | A01M 21/04 |
| 2017/0260766 A1* | 9/2017 | Hui | E04H 4/1636 |
| 2017/0348711 A1* | 12/2017 | Cole | B05B 7/08 |
| 2018/0051681 A1* | 2/2018 | Wells | A01C 23/04 |
| 2018/0104709 A1* | 4/2018 | Peters | B05B 12/0026 |
| 2018/0117608 A1* | 5/2018 | Cole | B05B 7/2486 |
| 2018/0146656 A1* | 5/2018 | Bick | A01M 1/2038 |
| 2018/0160671 A1* | 6/2018 | Hogue | A01M 7/0064 |
| 2018/0178230 A1* | 6/2018 | Warren | B29B 7/74 |
| 2019/0059350 A1* | 2/2019 | Haghoo | A01M 7/0032 |

\* cited by examiner

EXTENSIBLE PESTICIDE APPLICATOR

CROSS-REFERENCE TO RELATED APPLICATIONS

This nonprovisional application claims the benefit of provisional application No. 62354720 filed on Jun. 25, 2016

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of pesticide applicators are known in the prior art. However, what is needed is an extensible pesticide applicator that includes an extensible pole having a pair of coiled tubes interiorly disposed between a proximal end of the extensible pole and a distal end of said extensible pole, each of said pair of coiled tubes uncoilable when said extensible pole extends longitudinally, wherein pesticide is storable interior to each of a liquid chamber and a dust chamber disposed proximally within the extensible pole, said pesticide thence forcible for delivery through each of a pair of nozzles disposed distally upon said extensible pole when a pump member effects pressurization of each of said dust and liquid chambers and a trigger member is subsequently released, whereby direct application of pesticides to hard-to-reach habitat is distally effective relative a user and spray-back and cross-contamination from pesticide ejection is preventable.

FIELD OF THE INVENTION

The present invention relates to an extensible pesticide applicator, and more particularly, to an extensible pesticide applicator that includes an extensible pole having a pair of coiled tubes interiorly disposed between a proximal end of the extensible pole and a distal end of said extensible pole, each of said pair of coiled tubes uncoilable when said extensible pole extends longitudinally, wherein pesticide is storable interior to each of a liquid chamber and a dust chamber disposed proximally within the extensible pole, said pesticide thence forcible for delivery through each of a pair of nozzles disposed distally upon said extensible pole when a pump member effects pressurization of each of said dust and liquid chambers and a trigger member is subsequently released, whereby direct application of pesticides to hard-to-reach habitat is distally effective relative a user and spray-back and cross-contamination from pesticide ejection is preventable.

SUMMARY OF THE INVENTION

The general purpose of the extensible pesticide applicator, described subsequently in greater detail, is to provide an extensible pesticide applicator which has many novel features that result in an extensible pesticide applicator which is not anticipated, rendered obvious, suggested, or even implied by prior art, either alone or in combination thereof.

The present extensible pesticide applicator has been devised to enable distal application of liquid and powdered pesticides, and other noxious and toxic agents, to a site out-of-reach of a user. Moreover, the present extensible pesticide applicator ensures release of said noxious or toxic agents removed from the specific location of a user, whereby cross-contamination and spray back onto said user is preventable.

Many insects and other pests build habitat in inaccessible and hard-to-reach places. The present extensible pesticide applicator has been devised to enable direct application of pesticide upon said habitat by extension of an extensible pole to situate a pair of nozzles proximal said habitat whereby subsequent release of pesticide, or other noxious or toxic agent, effects direct contact with said habitat. A scraper member is attachable at a distal end of the extensible pole to eliminate or remove habitat from overhanging or other hard-to-reach sites.

The present extensible pesticide applicator, therefore, includes a hollow extensible pole having a proximal end and a distal end. A pair of coiled tubes is disposed interior to the extensible pole, connecting a liquid chamber and a dust chamber with a pair of nozzles disposed at the distal end. Powdered substance is forcible from the dust chamber out one of the pair of nozzles and liquid substance is forcible from the liquid chamber out of the other of the pair of nozzles when a pump member, disposed upon the extensible pole proximal the proximal end, is successively compressed to selectively pressurize each of the dust and liquid chambers, as desired, and a trigger member is thence engaged to effect pressurized delivery of said substances for ejection through each associated nozzle.

Each of the pair of coiled tubes uncoils when the extensible pole is extended in length, and each of the pair of coiled tubes coils when the extensible pole is retracted in length, whereby fluid communication is maintained between each of the dust and liquid chambers and the pump between a minimum extension of the extensible pole and a maximum extension of the extensible pole.

Attachment of the scraper member at the distal end is effective for scraping and detaching, for example, nests made by wasps, bees, and other apia or inscetae, whereby direct application of pesticide and thence ready removal of remaining habitat from hard-to-reach places is effective. Additional attachable members are contemplated for attachment at the distal end, such as a dusting device.

Thus has been broadly outlined the more important features of the present extensible pesticide applicator so that the detailed description thereof that follows may be better understood and in order that the present contribution to the art may be better appreciated.

For better understanding of the extensible pesticide applicator, its operating advantages and specific objects attained by its uses, refer to the accompanying drawings and description.

BRIEF DESCRIPTION OF THE DRAWINGS

Figures

FIG. 1 is an isometric view of an example embodiment with each of a pair of coiled tubes visible within an extensible pole.

FIG. 2 is a detail view of a proximal end of an example embodiment.

FIG. 3 is an isometric view of an example embodiment.

FIG. 4 is a detailed view of a distal end of an example embodiment.

DETAILED DESCRIPTION OF THE DRAWINGS

Figure 1:
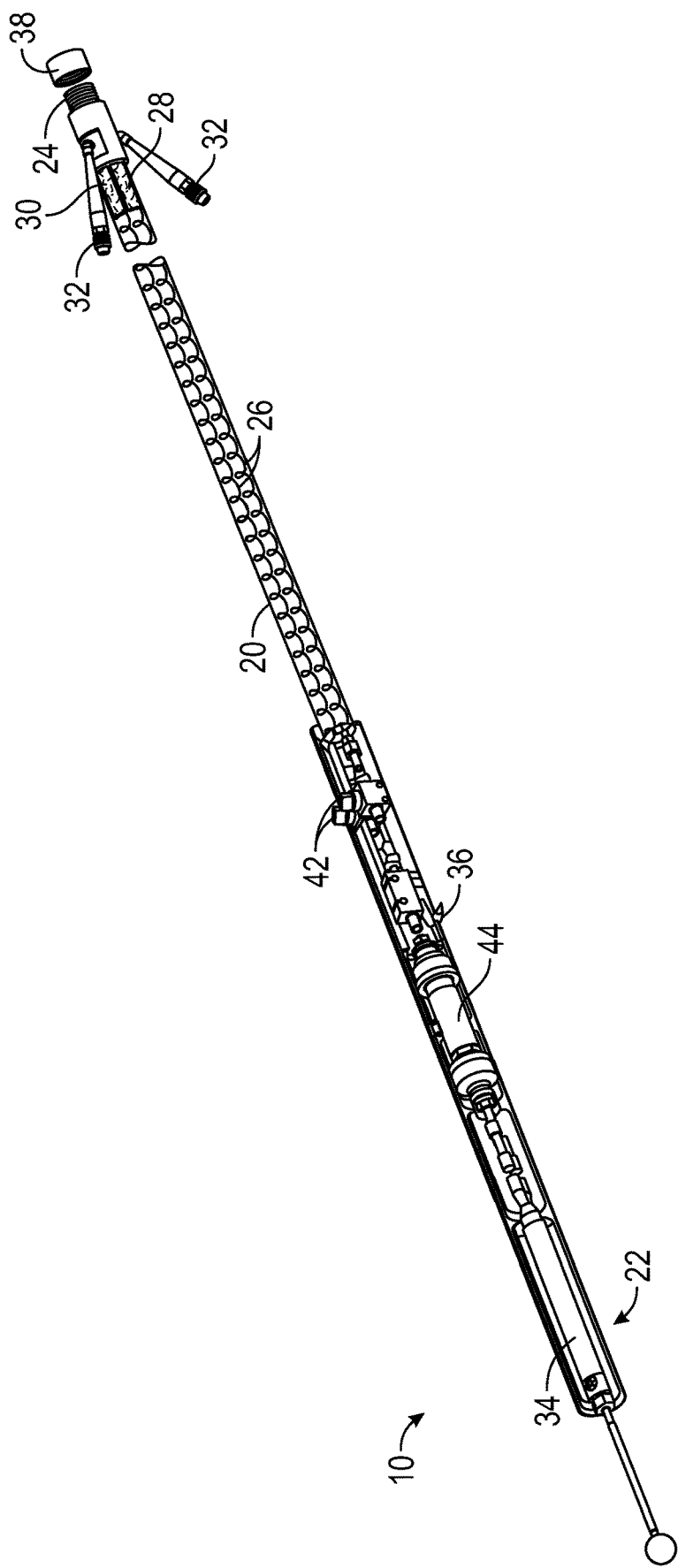
Figure 2:
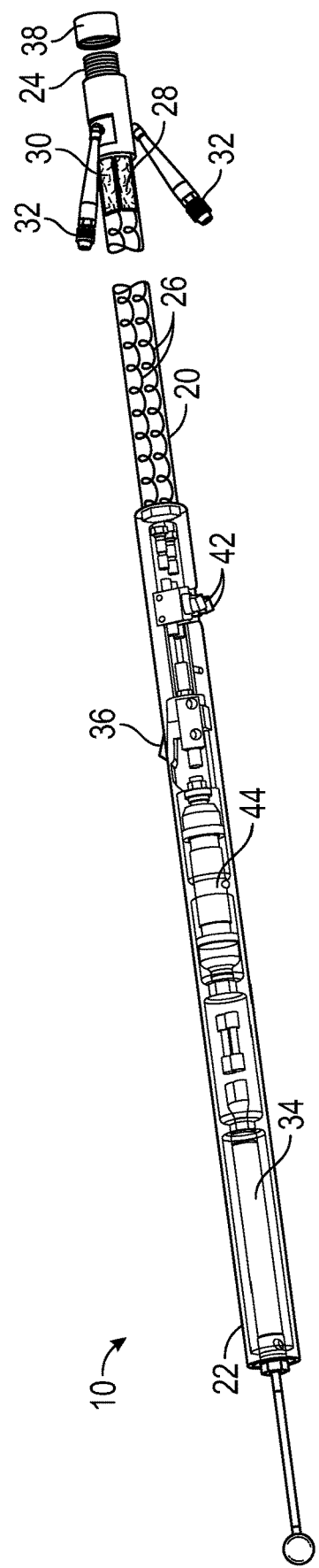
Figure 3:
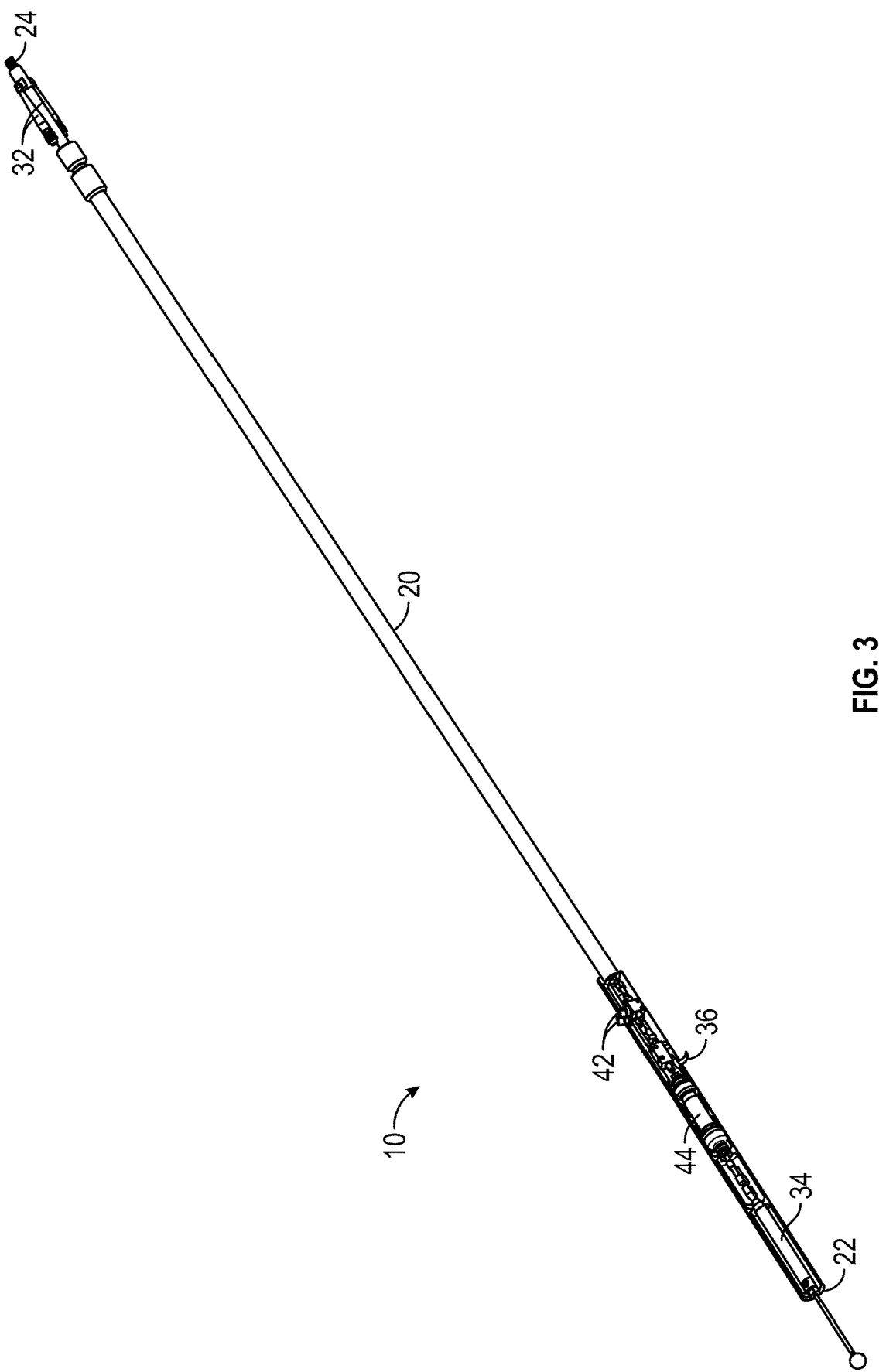
Figure 4:
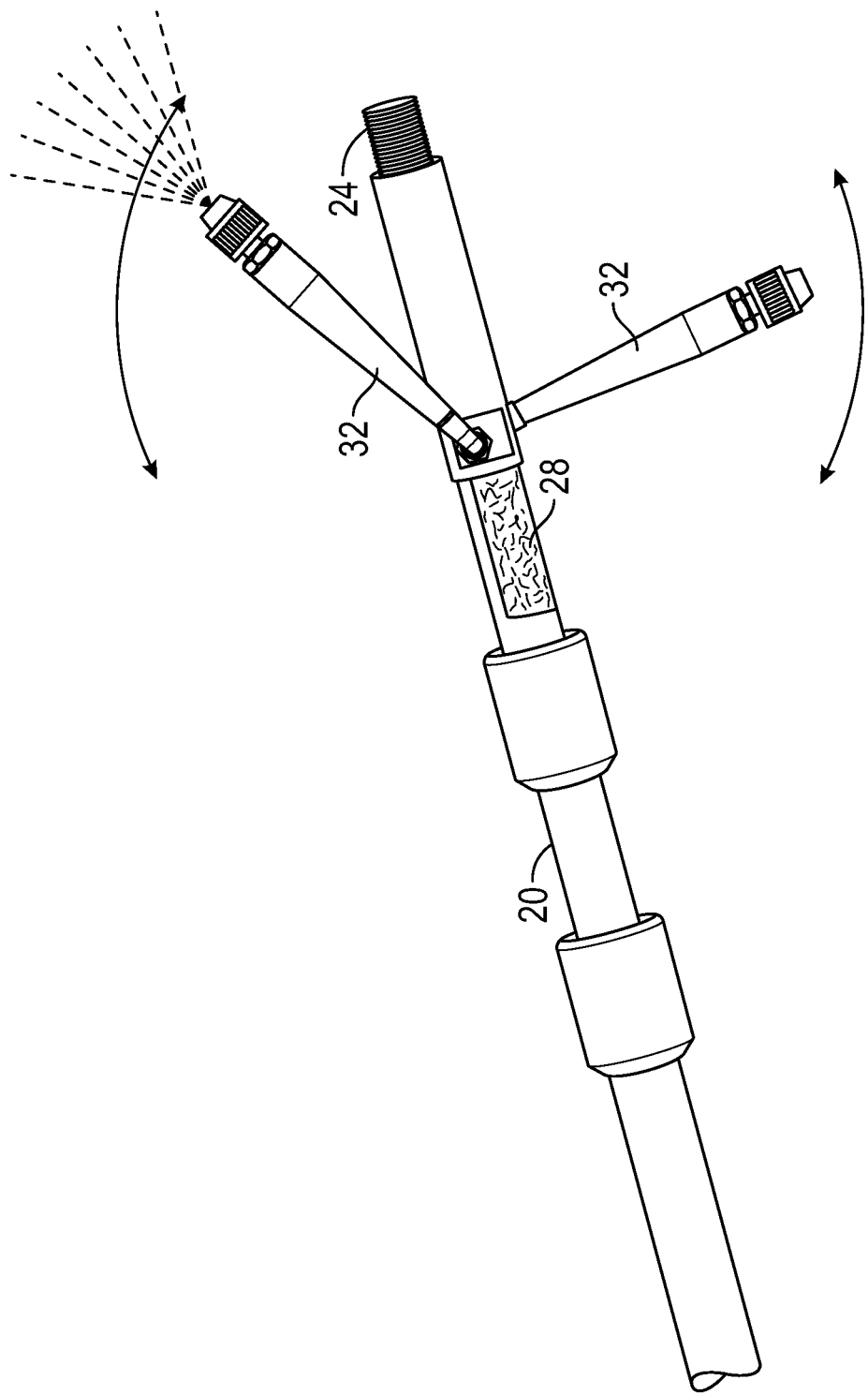
Figure 5:
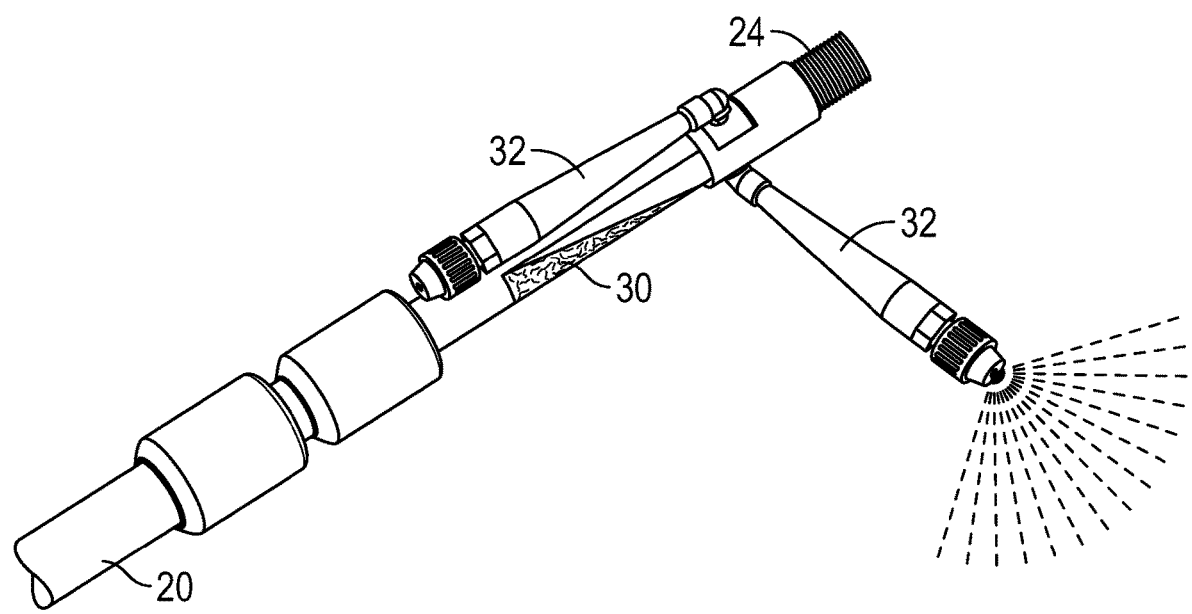
FIG. 5 is a detailed view of a distal end of an example embodiment.
Figure 6:
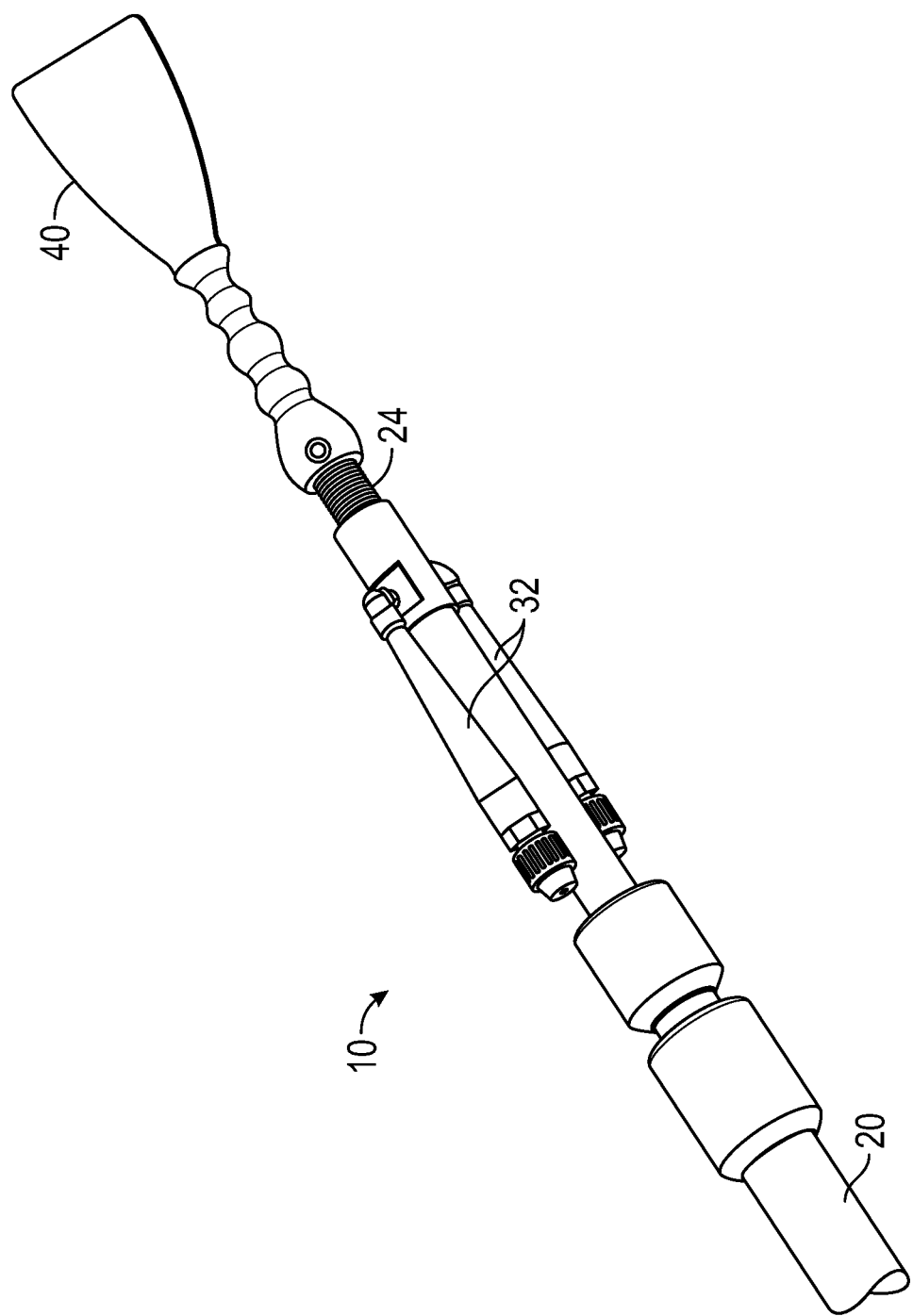
FIG. 6 is a detailed view of a distal end of an example embodiment with a scraper member attached.
Figure 7:
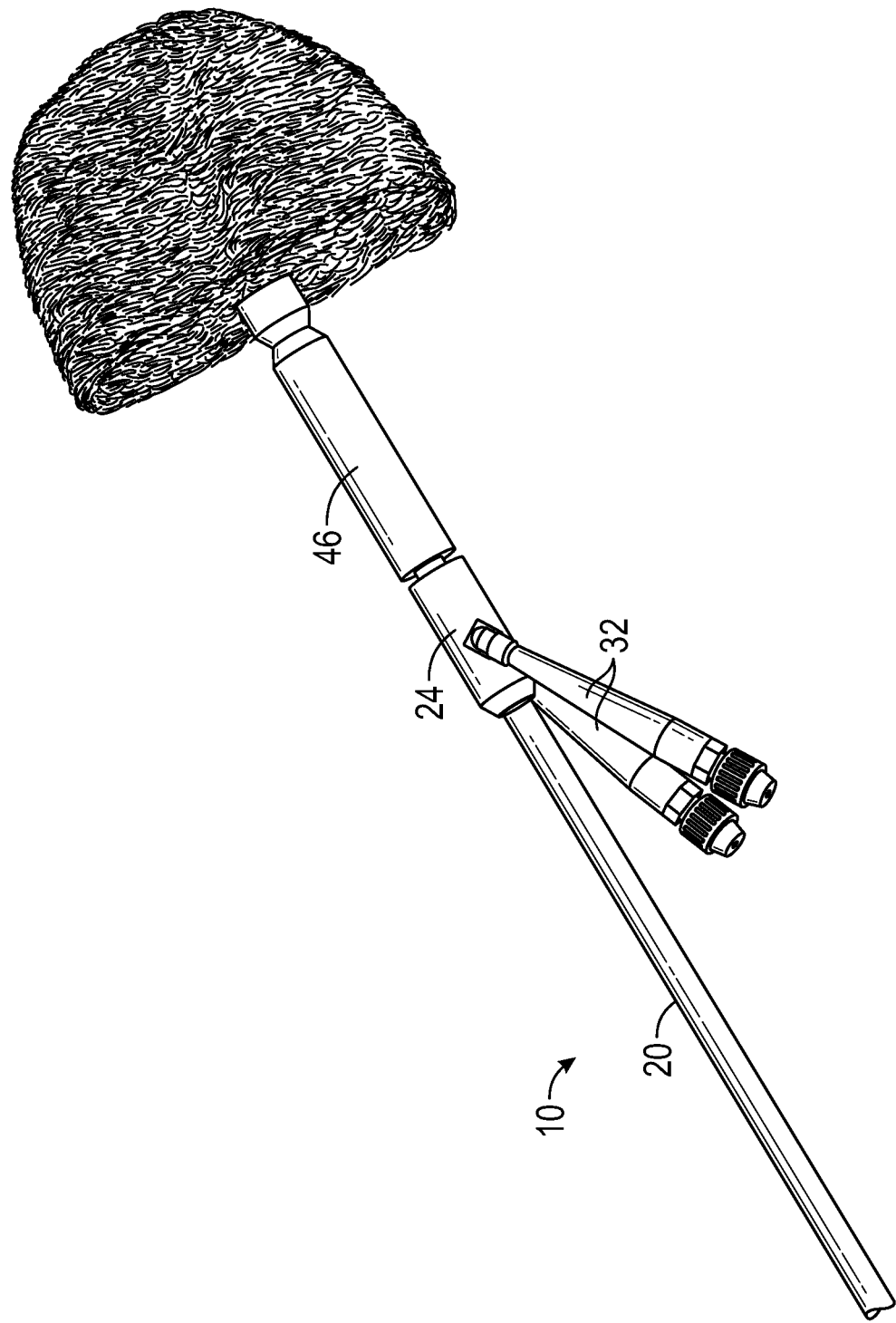
FIG. 7 is a detailed view of a distal end of an example embodiment with a duster member attached.

With reference now to the drawings, and in particular FIGS. 1 through 3 thereof, example of the instant extensible pesticide applicator employing the principles and concepts of the present extensible pesticide applicator and generally designated by the reference number 10 will be described.

Referring to FIGS. 1 through 3 a preferred embodiment of the extensible pesticide applicator 10 is illustrated.

The present extensible pesticide applicator 10 has been devised to enable direct application of a plurality of pesticides and toxic agents distally upon a site distanced from a user. The present extensible pesticide applicator 10 includes an extensible pole 20 having a pair of coiled tubes 26 disposed therein, each of said pair of coiled tubes 26 disposed between a proximal end 22 and a distal end 24 of the extensible pole 20. Extension of the extensible pole 20 between a minimum extension and a maximum extension alternately coils and uncoils said pair of coiled tubes 26 wherein fluid communication is enabled between a dust chamber 28 and a liquid chamber 30 and each of a pair of nozzles 32 disposed at the distal end 24 of said extensible pole 20 and a pressurizeable container 44, pressurizeable by action of a pump member 34 proximally disposed at the proximal end 22.

Liquid pesticide, or other noxious or toxic agent, is storable within the liquid chamber 30 at the distal end 24 and powdered pesticide, or other noxious or toxic agent, is storable interior to the dust chamber 28. Access to each of the dust chamber 28 and liquid chamber 30 is provided by a removable screw cap 38 sealably attachable at the distal end 24.

A pump member 34 is disposed at the proximal end 22 and disposed to selectively pressurize the pressurizeable container 44 whereby depression of a trigger member 36, disposed proximal the proximal end 22 of the extensible pole 20, releases pressure through each of the dust chamber 28 and the liquid chamber 30 whereby liquid pesticide and powdered pesticide is forcibly ejected from the pair of nozzles 32 disposed at the distal end 24. Release of pressure form the pressurizeable container 44 effects forced ejection of fluid through each of the dust chamber 28 and liquid chamber 30 when a valve control 42, disposed proximal the trigger member 36, is set appropriate to deliver pressurized atmosphere from the pressurizeable container 44 to either the dust chamber 28 only, the liquid chamber 30 only, or both the dust and liquid chambers 28, 30 concurrently.

Each of the pair of nozzles 32 may be pivotally attached at the distal end 24 of the extensible pole 20, and thereat deployable between a closed situation, folded inline and parallel with the extensible pole 20, and an open situation, folded out oblique the extensible pole 20, or perpendicular thereto, whereby open communication with the pair of coiled tubes 26 is effective. Each of the pair of nozzles 32 is thus deployable at a desired angle relative the extensible pole 20 whereby directed application of pesticide is enabled to meet the position of the targeted habitat or area appropriately.

Thus a user is enabled direct application of liquid and powdered pesticide to a site distally disposed relative said user, such as may be out of reach or otherwise inconveniently positioned. Moreover a user is enabled to remain a safe distance from the pair of nozzles 32 whereby cross-contamination or accidental exposure to the pesticides, or other noxious or toxic agents, is preventable.

The extensible pole 20 further includes a scraper member 40 attachable at the distal end 24 whereby a user may use the extensible pole 20 to remove hives, and other insect habitat, from hard-to-reach areas subsequent application of pesticide. The extensible pole 20 further includes a duster member 46 attachable at the distal end 24 whereby a user may use the extensible pole 20 to remove dirt and debris along out-of-reach surfaces or areas.

What is claimed is:

1. An extensible pesticide applicator comprising:
an extensible pole having a proximal end and a distal end;
a dust chamber disposed at the distal end, said dust chamber configured to house an existing powdered insecticide additional thereto;
a liquid chamber disposed at the distal end, said liquid chamber configured to house an existing liquid pesticide additional thereto;
a pump member disposed at the proximal end, said pump member manually compressible to pressurize ambient air into the extensible pole;
a pair of coiled tubes, wherein a first tube of the pair of tubes connects the dust chamber in fluid communication with the pump member and a second tube of the pair of tubes connects the liquid chamber in fluid communication with the pump member;
a trigger member disposed at the proximal end, said trigger member configured to depressurize the extensible pole when said trigger member is depressed; and
a pair of nozzles, wherein a first nozzle of the pair of nozzles is disposed in fluid communication with the dust chamber and a second nozzle of the pair of nozzles is disposed in fluid communication with the liquid chamber each of said pair of nozzles pivotally disposed at the distal end of the extensible pole member and deployable thereat;
wherein depression of the trigger member effects forced ejection of powdered insecticide from the dust chamber and alternately forced ejection of liquid insecticide from the liquid chamber subsequent to pressurizing by action of the pump member, whereby a user may apply insecticide distally to hard-to-reach and out-of-reach habitat.

2. The extensible pesticide applicator of claim 1 further comprising a pressurizeable container disposed in fluid communication with the pump member and each of the pair of coiled tubes whereby manual action of the pump member pressurizes ambient atmosphere into the pressurizeable container for release through the dust chamber and alternately the liquid chamber when the trigger member is depressed.

3. The extensible pesticide applicator of claim 2 further comprising a valve control configured to alternately select communication between the pressurizeable container and the dust chamber, the pressurizeable container and the liquid chamber, and the pressurizeable container and both the dust and liquid chambers simultaneously.

4. The extensible pesticide applicator of claim 3 further comprising a screw cap at the distal end, said screw cap configured for securable attachment to sealably enclose each of the dust chamber and liquid chamber.

5. The extensible pesticide applicator of claim 4 further comprising a scraper member attachable to the distal end, said scraper member usable to scrape away habitat from distal and out-of-reach surfaces.

6. The extensible pesticide applicator of claim 5 further comprising a duster member attachable at the distal end, said duster member usable to clean away debris from distal and out-of-reach surfaces and areas.

7. An extensible pesticide applicator comprising:
an extensible pole having a proximal end and a distal end;
a pressurizable container disposed interior to the extensible pole member;
a pump member disposed upon the extensible pole at the proximal end, said pump member compressible to pressurize ambient air into the pressurizeable container;
a trigger member disposed at the proximal end in a position appropriate for manual engagement, said trigger member configured to release pressure from the pressurizeable container when said trigger member is depressed;
a dust chamber disposed at the distal end, said dust chamber configured to house an existing powdered insecticide additional thereto;
a liquid chamber disposed at the distal end, said liquid chamber configured to house an existing liquid pesticide additional thereto;
a valve control disposed proximal the trigger member, said valve control operable to select between communication between the pressurizeable container and the dust chamber, communication between the pressurizeable container and the liquid chamber, and alternately communication between the pressurizeable container and both the dust chamber and liquid chamber;
a pair of nozzles, wherein a first nozzle of the pair of nozzles is disposed in fluid communication with the dust chamber and a second nozzle of the pair of nozzles is disposed in fluid communication with the liquid chamber each of said pair of nozzles pivotally disposed at the distal end of the extensible pole member and deployable thereat; and
a pair of coiled tubes, wherein a first tube of the pair of tubes connects the dust chamber in fluid communication with the pump member and a second tube of the pair of tubes connects the liquid chamber in fluid communication with the pressurizeable container;
wherein depression of the trigger member effects forced ejection of powdered insecticide from the dust chamber and alternately forced ejection of liquid insecticide from the liquid chamber subsequent pressurizing by action of the pump member, whereby a user may apply insecticide distally to hard-to-reach and out-of-reach habitat.

8. The extensible pesticide applicator of claim 7 further comprising a screw cap attachable at the distal end, said screw cap configured for securable attachment to sealably enclose each of the dust chamber and liquid chamber.

9. The extensible pesticide applicator of claim 8 further comprising a scraper member attachable to the distal end, said scraper member usable to scrape away habitat from distal and out-of-reach surfaces.

10. The extensible pesticide applicator of claim 9 further comprising a duster member attachable at the distal end, said duster member usable to clean away debris from distal and out-of-reach surfaces and areas.

* * * * *